United States Patent [19]

Kobayashi et al.

[11] Patent Number: 4,808,933
[45] Date of Patent: Feb. 28, 1989

[54] ROTATING SPEED MEASURING APPARATUS HAVING A CORRECTOR FOR LOW AND HIGH SPEEDS USING ANGLE AND FREQUENCY TRANSDUCERS

[75] Inventors: Sumio Kobayashi, Funabashi; Mutsuo Tokashiki, Narashino; Hiroyuki Tomita; Tadashi Okawa, both of Funabashi; Hiroshi Sugai, Sakura, all of Japan

[73] Assignee: Hitachi, Ltd., Tokyo, Japan

[21] Appl. No.: 13,545

[22] Filed: Feb. 11, 1987

[30] Foreign Application Priority Data

Feb. 19, 1986 [JP] Japan .................................. 61-32931

[51] Int. Cl.⁴ .......................... G01P 3/44; G01P 3/56
[52] U.S. Cl. .................................... 324/163; 324/166; 324/161
[58] Field of Search ............... 324/160, 161, 163–165, 324/177; 307/102, 106, 111; 73/510, 518; 318/310, 312, 317, 327

[56] References Cited

U.S. PATENT DOCUMENTS

| | | | |
|---|---|---|---|
| 3,919,634 | 11/1975 | Appel et al. | 324/163 |
| 3,934,200 | 1/1976 | Schoonover et al. | 324/163 |
| 4,246,536 | 1/1981 | Bradley et al. | 324/177 |
| 4,560,927 | 12/1985 | Ishida et al. | 324/163 X |
| 4,575,677 | 3/1986 | Dennis | 324/161 |

Primary Examiner—Reinhard J. Eisenzopf
Assistant Examiner—Jack B. Harvey
Attorney, Agent, or Firm—Antonelli, Terry & Wands

[57] ABSTRACT

A signal whose frequency is proportional to a rotational speed of a rotor and whose rising and falling angles near points crossing zero becomes larger with the rotational speed of the rotor is used to produce a first signal of amplitude corresponding to the rising and falling angles and a second signal of amplitude corresponding to the frequency, a difference between the first and second signals is evaluated, and the first or second signals are corrected with the difference.

12 Claims, 8 Drawing Sheets

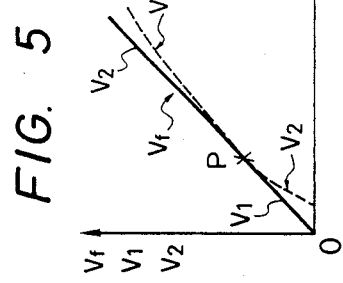
FIG. 2
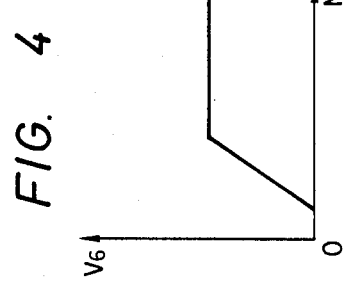
FIG. 3
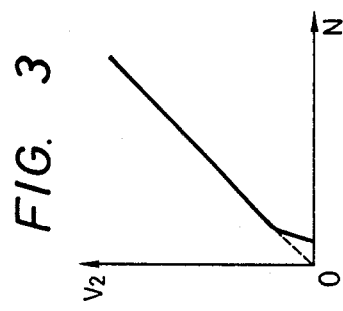
FIG. 4
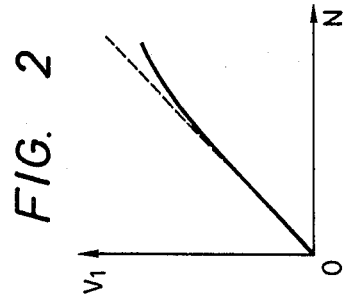
FIG. 5
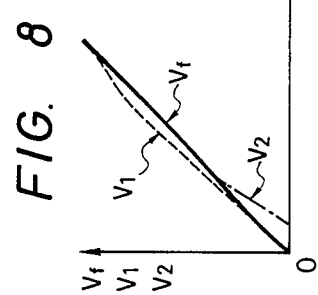
FIG. 8
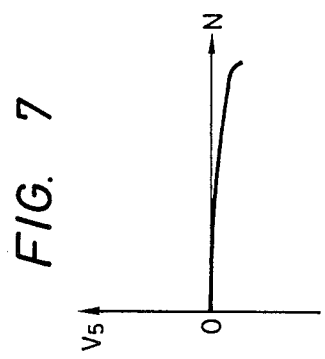
FIG. 7
FIG. 6

ROTATING SPEED MEASURING APPARATUS HAVING A CORRECTOR FOR LOW AND HIGH SPEEDS USING ANGLE AND FREQUENCY TRANSDUCERS

BACKGROUND OF THE INVENTION

1. Field of the Invention

The present invention relates to a rotating signal generator apparatus having a signal generator such as a sine encoder for producing a signal whose frequency is proportional to the rotational speed of a rotor and whose rising and falling angles near points crossing zero become larger with the rotating speed of the rotor. The apparatus generates the rotating signal of the rotational speed, the rotational position or the like.

2. Description of the Prior Art

It has been proposed in the official gazette of Japanese Patent Application Laid-open No. 57-175259 that an angle signal transducer for producing a first signal of a magnitude corresponding to the rising and falling angles of the output of the signal generator as stated above, and a frequency transducer for producing a second signal of a magnitude corresponding to the frequency of the output of the signal generator are provided to derive the rotating signal of the rotor by using the first signal in a low speed range and the second signal in a high speed range.

As shown in FIG. 2, the magnitude of the first signal exhibits a characteristic in which it is properly proportional to the rotational frequency of the rotor in the low speed range, but it becomes unproportional in the high speed range.

To the contrary, the magnitude of the second signal is properly proportional in the high speed range but is unproportional in the low speed range as illustrated in FIG. 3.

Accordingly, it is very effective for generating the rotating signal that the first and second signals are switched midway and then used as disclosed in the official gazette of Japanese Patent Application Laid-open No. 57-175259.

With the prior-art apparatus, however, there has been the problem that in switching the first signal to the second signal or vice versa, the rotating signal generator apparatus does not produce its output signal for a period of time.

It is of course possible to incorporate a capacitor for the purpose of sustaining the signal at the switching. This measure, however, worsens a quick response characteristic undesirably.

SUMMARY OF THE INVENTION

The present invention has been made in view of such drawbacks, and has for its object to provide a rotating signal generator apparatus which can generate a rotating signal of excellent characteristics without discontinuing its output signal over a range from a low speed range to a high speed range.

The present invention consists in disposing a calculator and a corrector in addition to a signal generator, an angle signal transducer and a frequency signal transducer.

The calculator calculates the difference between a first signal and a second signal, and the corrector corrects the first signal or the second signal with the output of the calculator.

As stated before, the first signal being the output by the angle signal transducer is properly proportional to the speed of the rotor in the low speed range, but the rate at which the signal increases relative to an increase in the rotational speed diminishes in the high speed range. The second signal being the output of the frequency signal transducer is properly proportional in the high speed range, but it exhibits only values smaller than on a proportionality line in the low speed range.

Accordingly, the second signal becomes smaller than the first signal in the low speed range, and the second signal becomes larger than the first signal in the high speed range. Therefore, a point P at which the first signal and the second signal intersect arises as shown in FIG. 5.

Now, letting $V_1$ denote the first signal and $V_2$ denote the second signal, the following is calculated by the calculator:

$$V_3 = V_1 - V_2 \tag{1}$$

When the calculated value is minus $$V_f = V_1 - V_3 \tag{2}$$

is found. Then, $V_f = V_2$ holds.

Accordingly, the signal $V_1$ left intact is delivered in a range of lower speeds with respect to the point P, and the component $V_3$ is correct for the signal $V_1$ at higher speeds with respect to the point P, whereby the rotating signal of characteristic superior to the characteristic curve of $V_1$ or $V_2$ alone can be generated. Moreover, since the combined characteristic curve is obtained on the basis of the characteristic curve $V_1$ in both the higher speed range and the lower speed range with respect to the point P, the signal can be produced continuously.

Besides, when the value of Eq. (1) is plus, $$V_f' = V_2 + V_3 \tag{3}$$

is found. Then, $V_f' = V_1$ holds.

Accordingly, the signal $V_2$ left intact is delivered in the higher speed range with respect to the point P, and the component $V_3$ is corrected for the signal $V_2$ at the lower speeds with respect to the point P, whereby the rotating signal of characteristic superior to the characteristic curve of $V_1$ or $V_2$ alone can be generated. Moreover, since the combined characteristic curve is obtained on the basis of the characteristic curve $V_2$ in both the higher speed range and the lower speed range with respect to the point P, the signal can be produced continuously.

BRIEF DESCRIPTION OF THE DRAWINGS

FIGS. 2–4 and FIGS. 6–7 are diagrams showing the input/output characteristics of individual elements in FIG. 1.

FIG. 5 is a diagram showing the input/output characteristic of the whole apparatus in FIG. 1.

FIG. 8 is a diagram of an input/output characteristic in a case different from FIG. 5.

DESCRIPTION OF THE PREFERRED EMBODIMENTS

Figure 1:
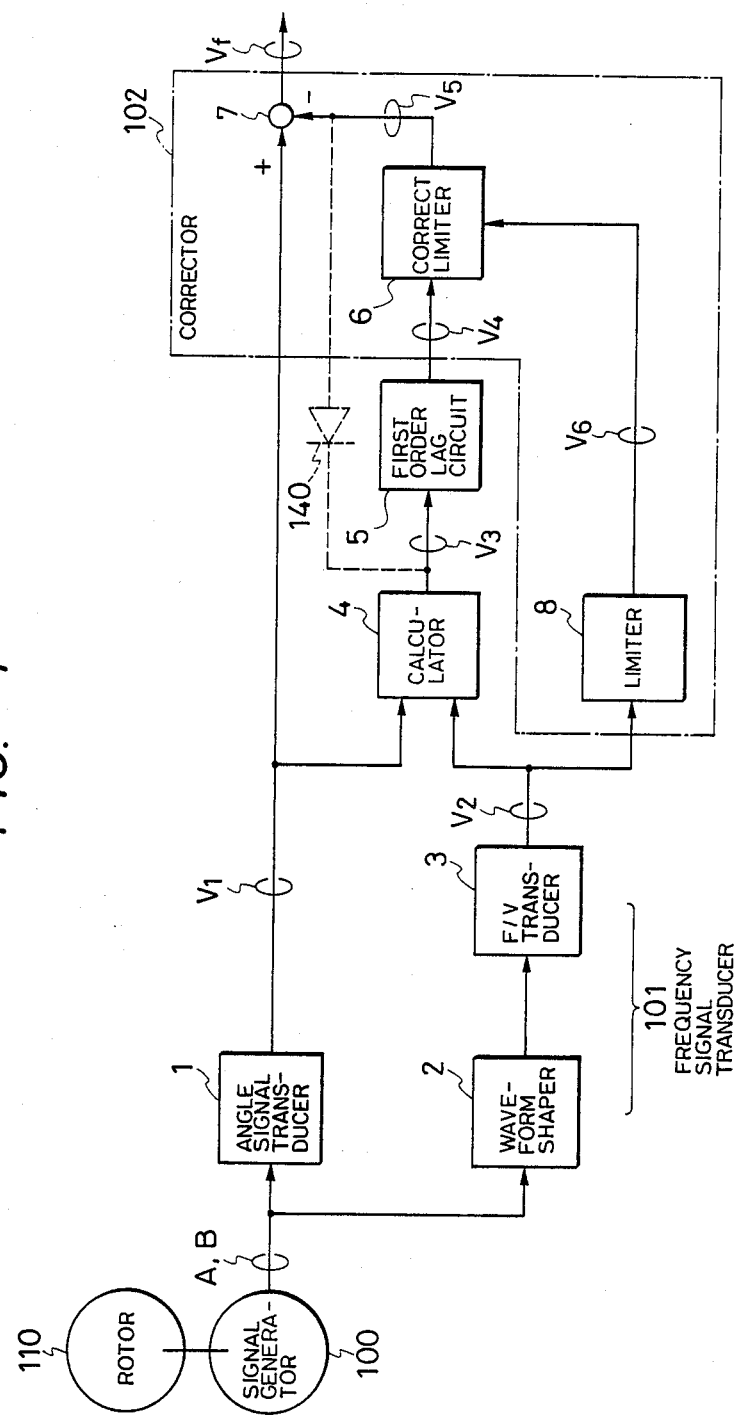
FIG. 1 is a block diagram showing an embodiment of a generator apparatus according to the present invention.

Now, an embodiment of the present invention will be described with reference to FIG. 1. The signals of a signal generator 100 which generates the "A" phase and "B" phase of a sine waveform having almost equal amplitudes and having a phase difference of 90° therebetween, owing to the rotation of a rotor 110 as in an electric motor, are differentiated by an angle signal transducer 1. The differential waveforms of the "A" phase and the "B" phase near points crossing zero are switched to deliver a first signal $V_1$ which is plus for the positive direction rotation of the rotor and minus for the negative direction rotation. Meanwhile, the "A" phase and the "B" phase have the sine waveforms converted into rectangular waves by a waveform shaper 2, whereupon a second signal $V_2$ which is a plus voltage for the positive direction rotation and a minus voltage for the negative direction rotation is delivered by an F/V (frequency/voltage) transducer 3. That is, a frequency signal transducer 101 is constructed of the waveform shaper 2 and the F/V transducer 3. The first signal $V_1$ has its linearity worsened by the degradations of the frequency characteristics of the "A" and "B" phases in a high speed range as illustrated in FIG. 2. The second signal $V_2$ has its pulse intervals lengthened at low speeds and therefore has its ripple increased, and it finally fails to be produced as illustrated by a characteristic in FIG. 3.

As regards both the first and second signals $V_1$ and $V_2$, $V_1-V_2$ is calculated by a calculator 4, and a signal $V_3$ having a characteristic in FIG. 6 is delivered.

Since a first order lag circuit 5 has a gain of unity in the steady state thereof, the output $V_4$ thereof becomes $V_3=V_4$ in the steady state, and this output has the maximum value limited by a correct limiter 6. A limiter signal generator 8 produces a limiter signal $V_6$ in FIG. 4 on the basis of the output $V_2$ of the F/V transducer 3, so that the output signal $V_5$ of the correct limiter 6 is limited to zero at the low speeds. Therefore, the characteristic in FIG. 6 changes as shown in FIG. 7. This signal $V_5$ is subtracted as a velocity feedback signal $V_f=V_1-V_5$ by a subtraction circuit 7. In this embodiment, a corrector 102 is constructed of the correct limiter 6, the limiter signal generator 8 and the subtraction circuit 7. Since the signal $V_5$ is a minus voltage in FIG. 7, the subtraction circuit results in adding the absolute value $V_5$ to the voltage $V_1$, and the velocity feedback signal of good linearity is obtained as shown at $V_f$ in FIG. 5.

As thus far described, at the low speeds, the output of the calculator 4 is limited to zero by the correct limiter 6, and hence, the velocity feedback signal based on the gradient differential system is generated.

On the other hand, in the high speed range, the calculator output is not limited by the correct limiter 6. Therefore, $V_5=V_1-V_2$ (only in the steady state at the high speeds) holds, and the velocity feedback signal becomes $V_f=V_1-V_5=V_2$, so that the output of the F/V system is generated.

Figure 9:
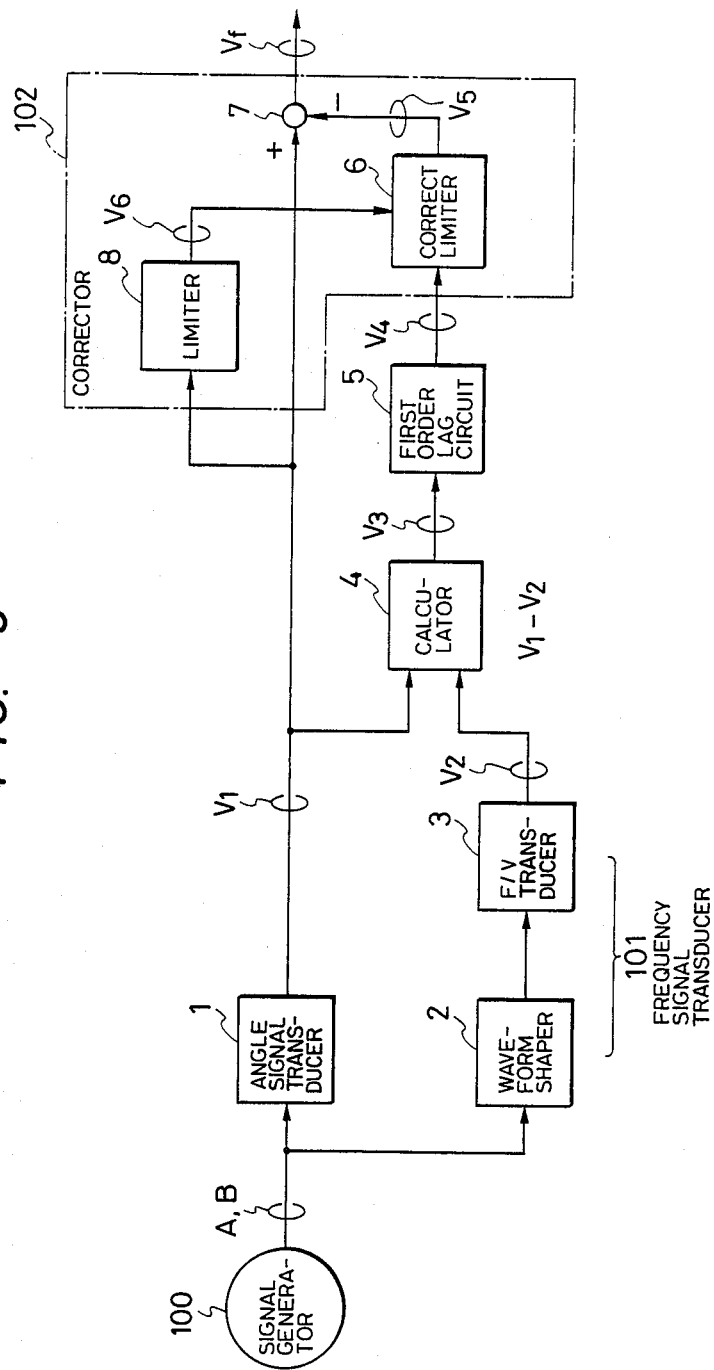
FIG. 9 is a block diagram showing another embodiment of the present invention.

FIG. 9 shows an embodiment in which the signal of the limiter signal generator 8 in FIG. 1 is detected from the output signal $V_1$ of the angle signal transducer 1, and the operation of which is basically the same as in FIG. 1.

Figure 10:
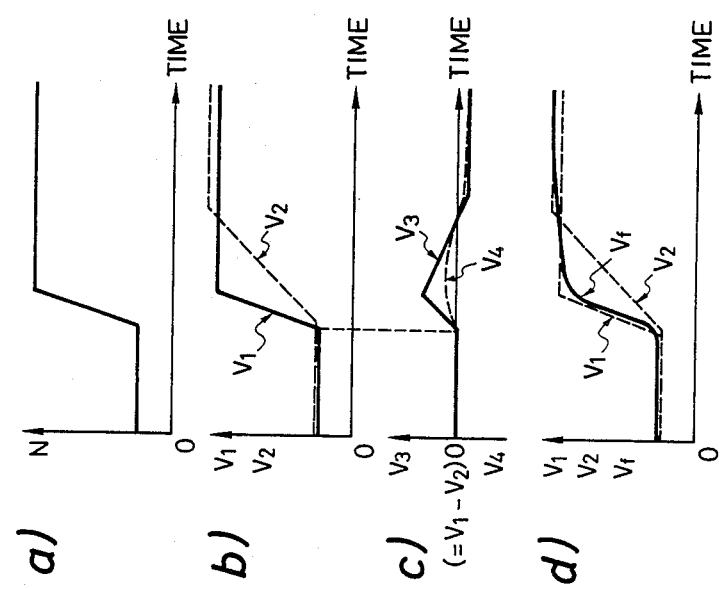
FIG. 10 shows time charts showing the transient states of a high speed range.

Next, FIG. 10(a) is a diagram in the case where the actual rotational frequency N of the rotor 110 has abruptly risen from a medium speed to a high speed. In this case, the first signal $V_1$ responds immediately as shown in FIG. 10(b), but the second signal $V_2$ undergoes a considerable delay as shown in the same figure. However, in a case where the speed N does not change abruptly, the second signal $V_2$ based on the F/V system affords a preciser value rather than the first signal $V_1$. The output $V_3$ of the calculator 4 becomes as shown in FIG. 10(c), and it is changed as shown at $V_4$ in FIG. 10(c) by the first order lag circuit 5. Since the signal $V_4$ corresponds to the high speed state, it is not affected by the correct limiter 6 and is subtracted directly as $V_5=V_4$ by the subtraction circuit 7. Then, it becomes as indicated by a solid line $V_f$ in FIG. 10(d). As seen from these situations, by constructing the first order lag circuit 5 in the high speed range, the output $V_f$ becomes quicker than the response of the second signal $V_2$ of the F/V system, and the response of the detector circuit is improved.

Now, practicable embodiments of the block diagram in FIG. 1 will be described in conjunction with FIG. 11, FIG. 13 and FIG. 14.

Figure 12:
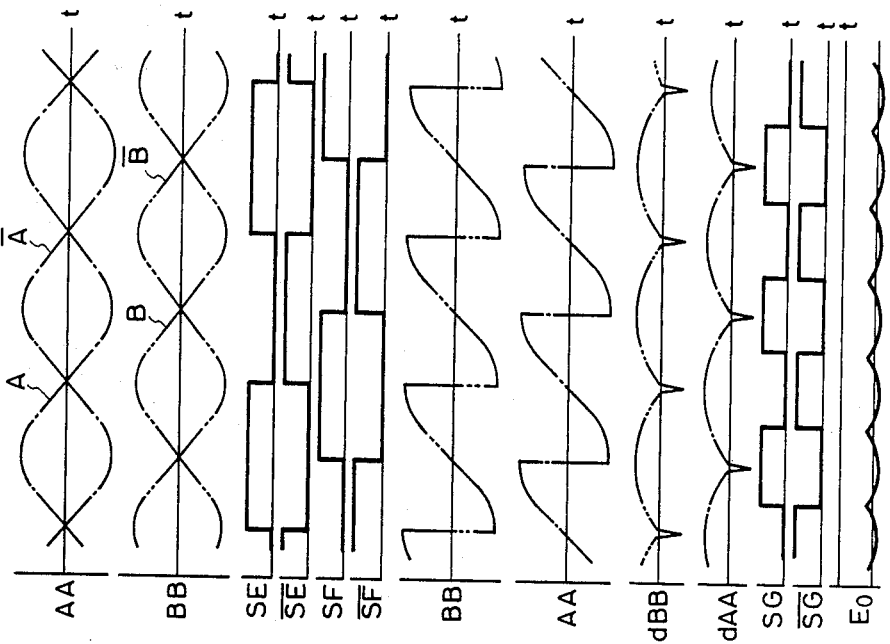
FIG. 12 is a time chart showing the operations of the circuit illustrated in FIG. 11.

First, the practicable embodiment of the angle signal transducer 1 will be described. The circuit example thereof is shown in FIG. 11, while the time chart thereof is shown in FIG. 12.

Figure 11:
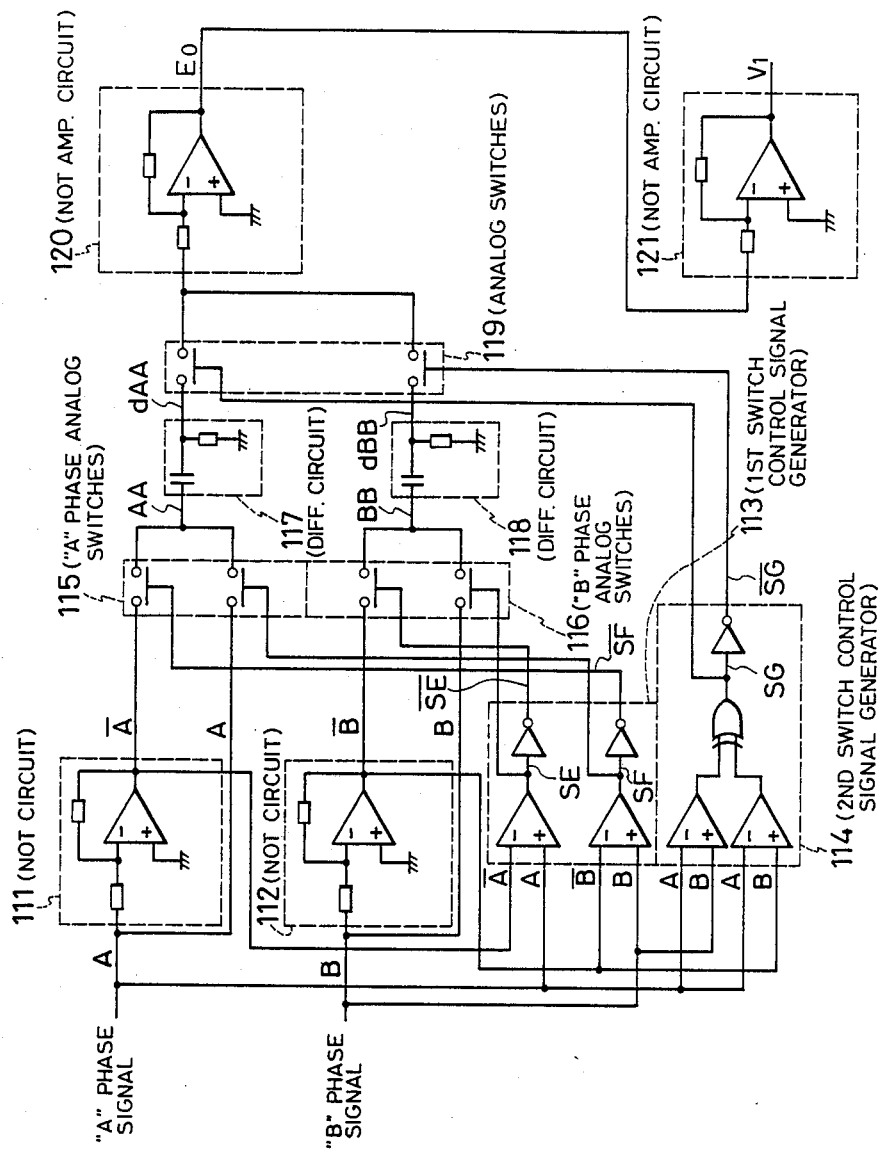
FIG. 11 is a circuit diagram showing a practicable example of an angle signal transducer.

In FIG. 11, numerals 111 and 112 indicate NOT circuits, numeral 113 a first switch control signal generator, numeral 114 a second switch control signal generator, numeral 115 "A" phase analog switches, numeral 116 "B" phase analog switches, numerals 117 and 118 differentiation circuits, numeral 119 slit removing analog switches, numeral 120 a NOT amplifier circuit, and numeral 121 a NOT amplifier circuit for adjusting a sign.

Regarding the "A" phase signal, the "A" phase signal A and the inverter "A" phase signal $\overline{A}$ are received through the analog switches 115, and the parts of the signals A and $\overline{A}$ having the same gradient are taken out. The output of the analog switches 115 becomes an "A" phase gradient signal AA shown in FIG. 12.

Regarding the "B" phase, likewise to the "A" phase, the "B" phase signal B and the inverted "B" phase signal $\overline{B}$ are received through the analog switches 116, and the parts of the signals B and $\overline{B}$ having the same gradient are taken out. The output of the analog switches 116 becomes a "B" phase gradient signal BB shown in FIG. 12.

In order to detect the speed, the gradient signals AA and BB of the "A" and "B" phases are differentiated by the respective differentiation circuits 117 and 118 each being constructed of a capacitor and a resistor. The outputs of the respective differentiation circuits 117 and 118 are differential signals dAA and dBB shown in FIG. 12.

These signals dAA and dBB are formed with slits as illustrated. In order to eliminate the slits, therefore, only parts of 90° near the peaks of the respective differential signals dBB and dAA are derived through the slit removing analog switches 119 and are combined. The combined signal is amplified by the NOT circuit 120, to obtain a speed detection signal $E_o$. The NOT circuit 121 serves to deliver the first signal $V_1$ which is the plus output for the positive direction rotation and the minus output for the negative direction rotation.

The control of the "A" phase analog switches 115 is performed with the output signals SF and $\overline{SF}$ of the first switch control signal generator 113. These output signals SF and $\overline{SF}$ are produced by comparing the "B" phase signal B and the inverted "B" phase signal $\overline{B}$.

Besides, the control of the "B" phase analog switches 116 is performed with the output signals SE and $\overline{SE}$ of the first switch control signal generator 113. These output signals SE and $\overline{SE}$ are produced by comparing the "A" phase signal A and the inverted "A" phase signal $\overline{A}$.

Further, the slit removing analog switches 119 for eliminating the slits are controlled with the output signals SG and $\overline{SG}$ of the second switch control signal generator 114. The signal SG is obtained by comparing the "A" phase signal A with the "B" phase signal B and also comparing the "A" phase signal A with the inverted "B" phase signal $\overline{B}$ and then taking the exclusive OR of the comparison outputs.

Figure 13:
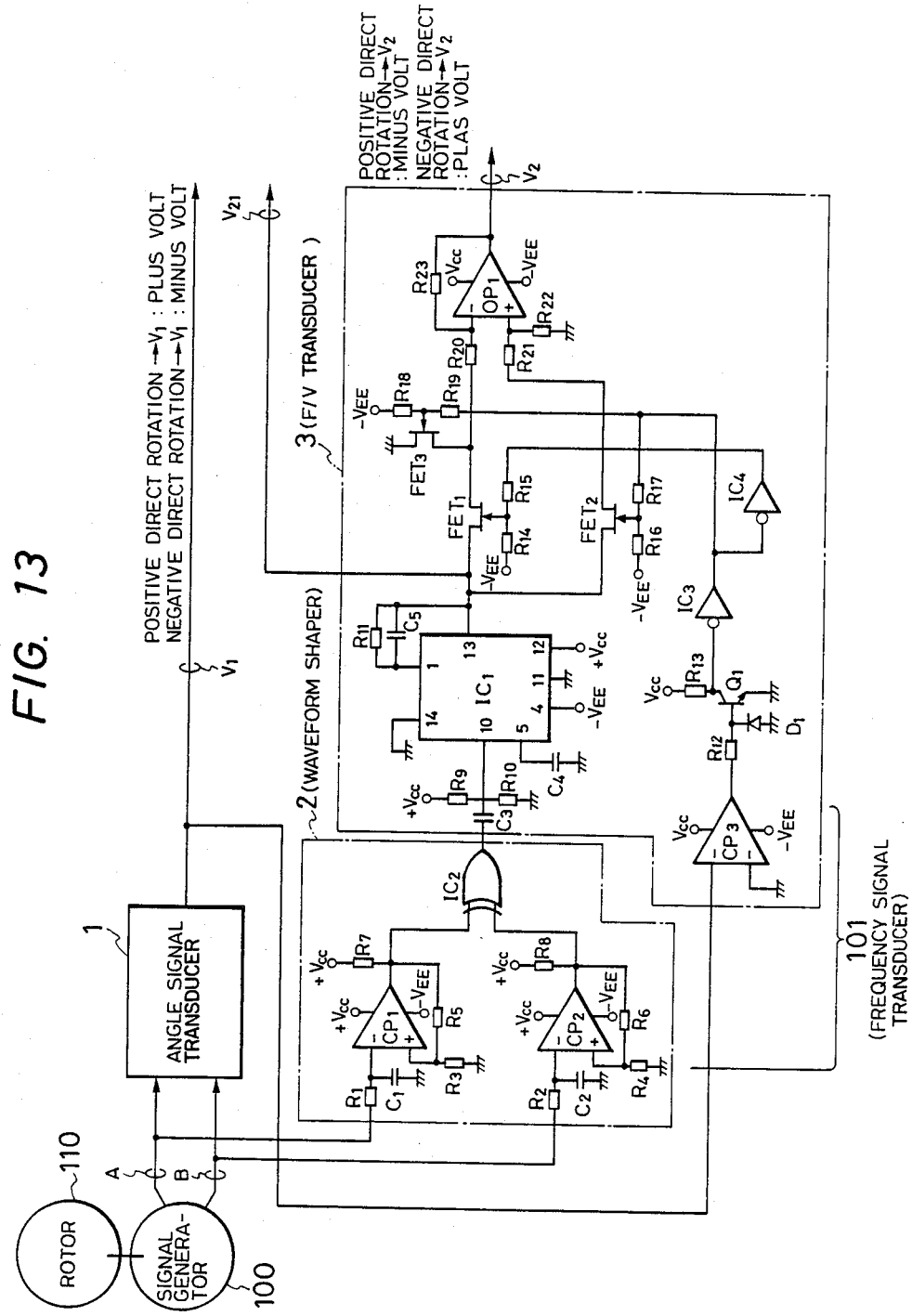
FIGS. 13 and 14 are circuit diagrams principally showing practicable examples of a frequency signal transducer and a corrector, respectively.

FIG. 13 shows the practicable embodiment of the waveform shaper 2 as well as the F/V transducer 3 in FIG. 1. It is as stated before that the frequency signal transducer 101 is constructed of the waveform shaper 2 and the F/V transducer 3.

The "A" phase and "B" phase of sine waveform with the phase difference of 90° as produced from the signal generator 100 are respectively passed through filters $R_1$, $C_1$ and $R_2$, $C_2$, whereupon the passed signals are converted into the rectangular waves having the phase difference of 90° by means of hysteresis comparators $CP_1$, $CP_2$ and resistors $R_3$-$R_8$. The rectangular waves are passed through an exclusive OR gate $IC_2$ to double the pulse frequency, and the resulting signal is applied to an F/V converter $IC_1$. This F/V converter detects the falls of the input pulses when the pulses exceed an input threshold voltage of $-0.6V$, and it supplies a pin 13 with a voltage proportional to an input frequency. A capacitor $C_3$ and resistors $R_9$, $R_{10}$ configure a differentiation circuit so as to pass the input pulses through the threshold voltage of $-0.6V$. The gain of the F/V converter $IC_1$ is determined by a resistor $R_{11}$, and the filter time constant thereof by the resistor $R_{11}$ and a capacitor $C_5$. Therefore, the capacitance of the capacitor $C_5$ is enlarged for reducing the ripple of the output. This measure, however, worsens the responsiveness.

A capacitor $C_4$ determines the pulse width of a one-shot multivibrator which produces a pulse of the fixed width synchronous with the fall input of the F/V converter. The output of the F/V converter is delivered as an absolute value in the plus sign. Therefore, analog switches employing field effect transistors $FET_1$-$FET_3$, and resistors $R_{20}$-$R_{23}$ are disposed on the input side of an operational amplifier $OP_1$, whereupon for the positive direction rotation, the amplifier $OP_1$ is operated as an inverting amplifier by turning "on" the transistor $FET_1$ and "off" the transistors $FET_2$ and $FET_3$, and for the negative direction rotation, the amplifier $OP_1$ is operated as a non-inverting amplifier by turning "off" the transistor $FET_1$ and "on" the transistors $FET_2$ and $FET_3$. Thus, the F/V transducer 3 with the polarity which renders the output $V_2$ a minus voltage for the positive direction rotation and a plus voltage for the negative direction rotation is constructed. In addition, a zero-crossing transducer $CP_3$ detects the rotating direction from the first signal $V_1$ which is the output of the angle signal transducer 1 based on the gradient differentiation. The detected signal has its level changed by resistors $R_{12}$, $R_{13}$, a diode $D_1$ and a transistor $Q_1$, and the resulting signal is applied to an inverter gate $IC_3$ and then to an inverter gate $IC_4$ so as to operate the switches $FET_1$-$FET_3$.

Subsequently, the second signal $V_2$ being the output of the F/V transducer 3 has its difference voltage from the first signal $V_1$ being the output of the angle signal transducer 1 detected by an amplifier $OP_{51}$ and resistors $R_{51}$-$R_{54}$ which constitute the calculator 4 shown in FIG. 14. A capacitor CT indicated by a broken line between the output of the amplifier $OP_{51}$ and the minus input terminal thereof functions as the first order lag circuit shown in FIG. 1. The first order lag is not formed when the capacitor CT is detached, and the first order lag circuit is established by adding the capacitor CT.

Figure 14:
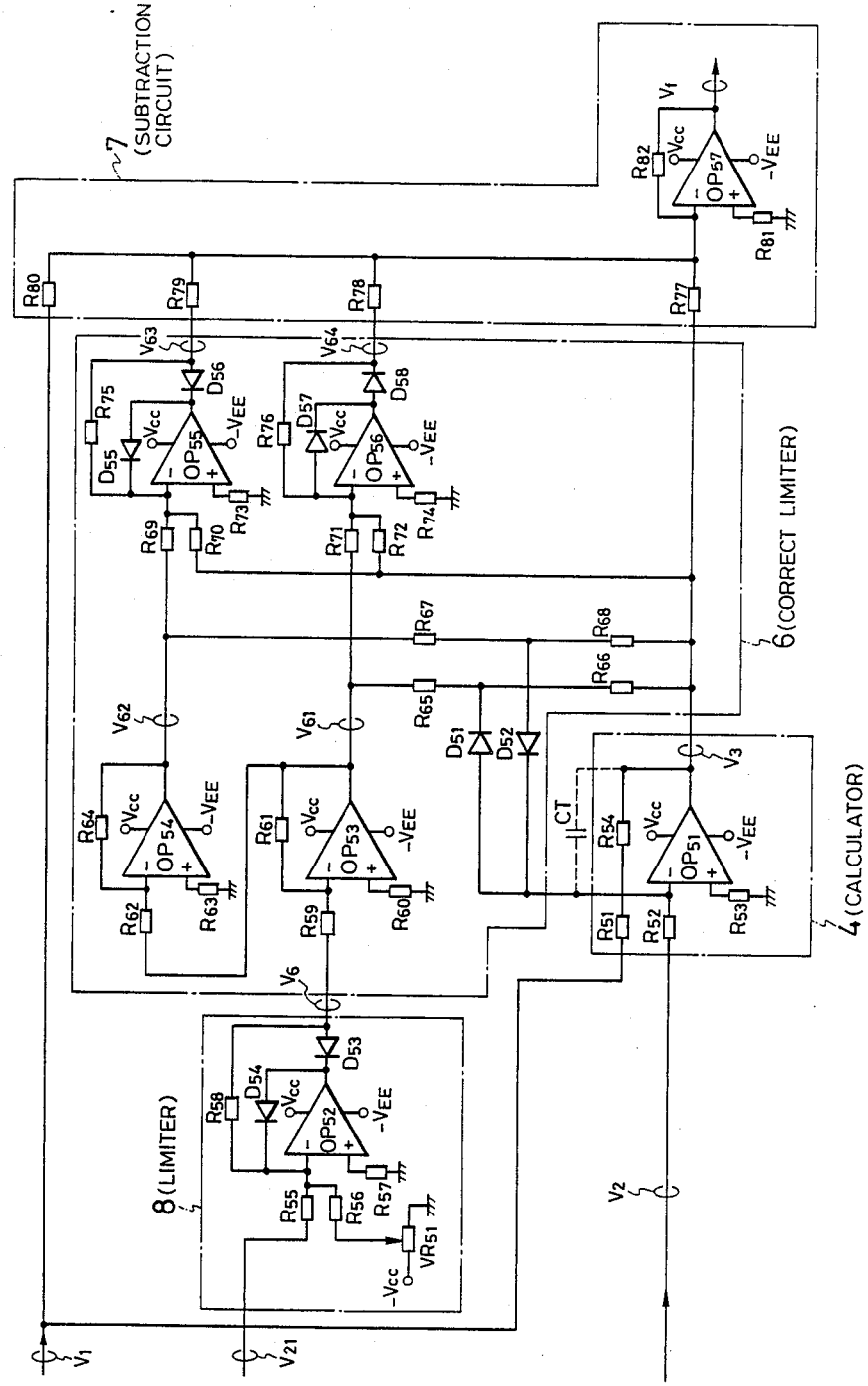
Figure 16:
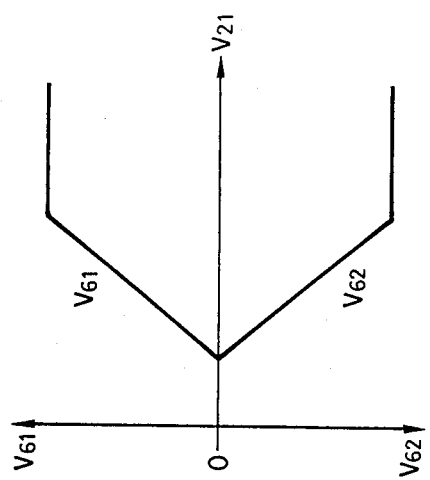
FIGS. 15 and 16 are diagrams of the input/output characteristics of a limiter signal generator and a correct limiter, respectively.
Figure 15:
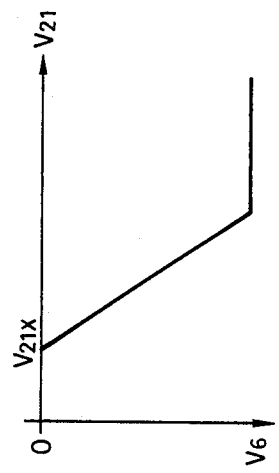

Since the F/V converter $IC_1$ in FIG. 13 delivers the output of the plus absolute value, the limiter signal generator 8 is configured as a circuit which receives this output signal $V_{21}$ at the pin 13 and which affords a dead band near the zero input as shown in FIG. 15 by means of an amplifier $OP_{52}$, resistors $R_{55}$-$R_{58}$ and diodes $D_{53}$, $D_{54}$. In FIG. 15, a value $V_{21x}$ can be adjusted by a variable resistor $VR_{51}$ in FIG. 14, and it determines the point of time at which the correction of the first signal $V_1$ with the output of the calculator 4 is started. The variable resistor may well be replaced with resistors for voltage division. The reason why the output $V_6$ remains unchanged when the input $V_{21}$ in FIG. 15 is great, is that the amplifier $OP_{52}$ is saturated. This signal $V_6$ limits the output of the difference voltage detector 4 in the correct limiter 6.

As shown in FIG. 14, the signal $V_6$ provides a signal $V_{61}$ to serve as the minus side limiter signal of the output voltage $V_3$ of the amplifier $OP_{51}$ and a signal $V_{62}$ to serve as the plus side limiter signal thereof by means of NOT amplifier circuits $OP_{53}$, $OP_{54}$ and resistors $R_{59}$-$R_{64}$. Resistors $R_{65}$-$R_{68}$ for dividing the limiter signals and the output signal $V_3$ of the calculator 4, and diodes $D_{51}$, $D_{52}$ are connected. Thus, an incomplete limiter circuit is constructed.

By way of example, when the signal $V_3$ has gradually increased on the minus side, the divided voltage of the node of the resistors $R_{65}$ and $R_{66}$ between the signal $V_3$ and the signal $V_{61}$ changes gradually from a plus voltage toward zero. When the divided voltage shifts from zero to a minus voltage, the diode $D_{51}$ turns "on," and current having flowed through the resistor $R_{54}$ of the amplifier $OP_{51}$ till then flows to the diode $D_{51}$. Therefore, the output $V_3$ can no longer rise, and the limiter operation is effected.

However, the limiter circuit configured of the elements $D_{51}$, $D_{52}$ and $R_{65}$-$R_{68}$ is not a complete limiter circuit, but its output rises slightly beyond the limit point. In order to form the complete limiter, therefore, a limiter correction circuit is constructed of amplifiers $OP_{55}$, $OP_{56}$, resistors $R_{69}$-$R_{76}$ and diodes $D_{55}$-$D_{58}$. That is, the limiter correction circuit is a circuit for canceling out the component having risen beyond the limit point on account of the signals $V_{61}$ and $V_3$ and the component having risen beyond the limit point on account of the signals $V_{62}$ and $V_3$. The signal $V_5$ in FIG. 1 is indicated by a sum $V_3+V_{63}+V_{64}$ in FIG. 14.

The first signal $V_1$ being the output of the angle signal comparator 1 is subtracted by elements $OP_{57}$ and $R_{77}$-$R_{82}$ through a resistor $R_{80}$, whereupon the output $V_f$ is delivered. These operations of the whole apparatus are as already described with reference to FIGS. 1-8.

The present invention is not restricted to the foregoing embodiments, but various alterations are possible. For example, in a case where the rotating direction need not be detected, a device which generates a signal in a single phase can be used as the signal generator. A device which generates signals in three phases can, of course, be used. In this case, the detection of the rotating direction is naturally easy. Besides, in the illustrated embodiments, the case employing the limiter 6 has been explained. However, when unidirectional conduction means 140 is connected as indicated by broken lines in FIG. 1 instead of the limiter 6, the first signal $V_1$ left intact is delivered as the output $V_f$ in the low speed range in which the signal $V_3$ is plus, and the first signal $V_1$ is corrected with the signal $V_3$ in the high speed range in which the signal $V_3$ is minus, namely, in the range in which the first signal $V_1$ becomes unproportional to the rotational frequency.

What we claim is:

1. A rotating signal generator apparatus which generates a signal corresponding to a rotational speed of a rotor, comprising:
    a signal generator which supplies a sinusoidal wave at a frequency corresponding to a rotational speed of the rotor;
    an angle signal transducer which supplies a first signal at a magnitude corresponding to at least one rising and falling angle of the sinusoidal wave from said signal generator;
    a frequency signal transducer which supplies a second signal at a magnitude corresponding to the frequency of said sinusoidal wave from said signal generator;
    a calculator which calculates a difference between the first signal and the second signal; and
    a corrector which corrects the first signal with the output of said calculator only in a range in which the rotational speed of the rotor is high.

2. A rotating signal generator apparatus as defined in claim 1, wherein said signal generator supplies signals in at least two phases which produce different patterns in correspondence with rotating directions of the rotor.

3. A rotating signal generator apparatus as defined in claim 1, wherein said signal generator supplies a signal of substantially constant magnitude irrespective of a rotational speed of the rotor.

4. A rotating signal generator apparatus which generates an analog signal corresponding to a rotational speed of a rotor, comprising:
    a signal generator which supplies a sinusoidal wave having frequency proportional to the rotational speed of the rotor and wherein rising and falling angles of said sinusoidal wave near points crossing zero becomes greater in proportion to an increase in the rotational speed of the rotor;
    an angle signal transducer which supplies a first signal at a magnitude corresponding to at least one of the rising and falling angles of the sinusoidal wave from said signal generator;
    a frequency signal transducer which supplies a second signal at a magnitude corresponding to the frequency of said sinusoidal wave from said signal generator;
    a calculator which calculates a difference between the first signal and the second signal; and
    a corrector which corrects the first signal with the output of said calculator only in a range in which the rotational speed of the rotor is high wherein said corrector supplies an analog signal substantially proportional to the rotational speed of the rotor.

5. A rotating signal generator apparatus as defined in claim 4 wherein said signal generator supplies a sinusoidal wave having at least two phases which produce different patterns in correspondence with rotating directions of the rotor.

6. A rotating signal generator apparatus as defined in claim 4 wherein said signal generator supplies a sinusoidal wave which does not exceed a set amplitude irrespective of a rotational speed of the rotor.

7. A rotating signal generator apparatus which generates a signal corresponding to a rotation of a rotor, comprising:
    a signal generator which supplies a sinusoidal wave at a frequency corresponding to a rotational speed of the rotor;
    an angle signal transducer which supplies a first signal at a magnitude corresponding to at least one rising and falling angle of the sinusoidal wave from said signal generator;
    a frequency signal transducer which supplies a second signal at a magnitude corresponding to the frequency of said sinusoidal wave from said signal generator;
    a calculator which calculates a difference between the first signal and the second signal; and
    a corrector which corrects the second signal with the output of said calculator only in a range in which the rotational speed of the rotor is low.

8. A rotating signal generating apparatus as defined in claim 7 wherein said signal generator supplies a sinusoidal wave having at least two phases which produce different patterns in correspondence with rotating directions of the rotor.

9. A rotating signal generator apparatus as defined in claim 7 wherein said signal generator supplies a sinusoidal wave which does not exceed a set amplitude irrespective of a rotational speed of the rotor.

10. A rotating signal generator apparatus which generates an analog signal corresponding to a rotation of a rotor, comprising:
    a signal generator which supplies a sinusoidal wave having frequency proportional to the rotational speed of the rotor and wherein rising and falling angles of said sinusoidal wave near points crossing zero becomes greater in proportion to an increase in the rotational speed of the rotor;
    an angle signal transducer which supplies a first signal at a magnitude corresponding to at least one of the rising and falling angles of the sinusoidal wave from the signal generator;
    a frequency signal transducer which supplies a second signal at a magnitude corresponding to the frequency of said sinusoidal wave from said signal generator;
    a calculator which calculates a difference between the first signal and the second signal; and a corrector which corrects the second signal with the output of said calculator only in a range in which the rotational speed of the rotor is low wherein said corrector supplies an analog signal substantially proportional to the rotational speed of the rotor.

11. A rotating signal generator apparatus as defined in claim 10 wherein said signal generator supplies a sinusoidal wave having at least two phases which produce different patterns in correspondence with rotating directions of the rotor.

12. A rotating signal generator apparatus as defined in claim 10 wherein said signal generator supplies a sinusoidal wave which does not exceed a set amplitude irrespective of a rotational speed of the rotor.

* * * * *